United States Patent
Hörlein et al.

[11] 3,900,499
[45] Aug. 19, 1975

[54] (THIO) PHOSPHORIC ACID AND (THIO) PHOSPHONIC ACID ESTERS AND AMIDES

[75] Inventors: Gerhard Hörlein, Frankfurt am Main; Gerhard Salbeck, Kelkheim, Taunus; Ludwig Emmel, Bergen-Enkheim, all of Germany

[73] Assignee: Hoechst Aktiengesellschaft, Frankfurt am Main, Germany

[22] Filed: Mar. 19, 1973

[21] Appl. No.: 342,491

[30] Foreign Application Priority Data
Mar. 24, 1972 Germany............................ 2214297

[52] U.S. Cl. ........................... 260/327 TH; 424/202
[51] Int. Cl.............................................. C07d 65/08
[58] Field of Search............................. 260/327 TH

[56] References Cited
FOREIGN PATENTS OR APPLICATIONS
1,164,596  9/1969  United Kingdom................. 260/327

*Primary Examiner*—Henry R. Jiles
*Assistant Examiner*—C. M. S. Jaisle
*Attorney, Agent, or Firm*—Curtis, Morris & Safford

[57] ABSTRACT

Thiochromanone oxime-phosphoric and -phosphonic acid derivatives of the formula

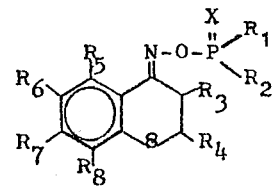

in which $R_1$ is O-alkyl, NH-alkyl or N-dialkyl; $R_2$ is alkyl, O-alkyl or phenyl; $R_3$ and $R_4$ are each hydrogen or alkyl; $R_5$, $R_6$, $R_7$ and $R_8$ are each hydrogen, alkyl, halogen, alkoxy or alkylthio, and X is oxygen or sulfur, are useful as insecticides, acaricides and nematicides.

16 Claims, No Drawings

(THIO) PHOSPHORIC ACID AND (THIO) PHOSPHONIC ACID ESTERS AND AMIDES

The invention relates to novel (thio)phosphoric and (thio)phosphonic acid derivatives of the formula

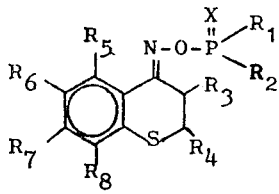

in which $R_1$ is O-alkyl, NH-alkyl, or N-dialkyl, $R_2$ is alkyl, O-alkyl, or phenyl, the alkyl groups of each radical having one to 10 carbon atoms, $R_3$ and $R_4$ are each hydrogen or lower alkyl, $R_5, R_6, R_7, R_8$ each are hydrogen, lower alkyl, halogen, lower alkoxy, or lower alkylthio, and X is oxygen or sulfur.

Preferred alkyl groups are those having one to four carbon atoms, preferably methyl and ethyl. Preferred halogens are fluorine, chlorine or bromine. From among the compounds of formula I those are preferred in which at least one of the radicals $R_3$ and $R_4$ and at least three of the radicals $R_5$ to $R_8$ are hydrogen.

The present invention also relates to a process for the manufacture of compounds of formula I which comprises reacting (thio)phosphoric or (thio)phosphonic acid ester or acid amide halides of formula

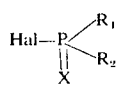

with thiochromanone oximes of the formula

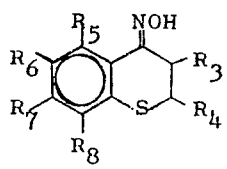

either per se in the presence of acid-binding agents, or in the form of their salts, hal in formula II preferably being chlorine or bromine. The reaction can be illustrated by the following scheme:

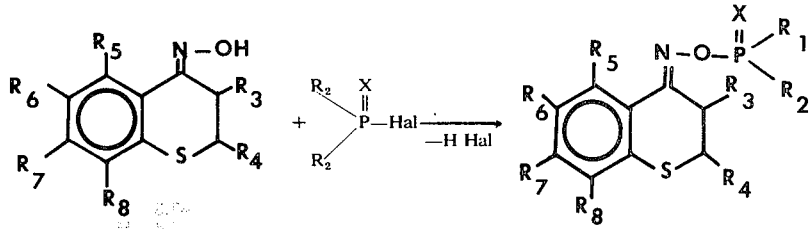

According to a modification of the process of the invention the thiochromanone oximes of formula III can also be reacted with (thiono)phosphoric or (thiono)phosphonic acid ester or amide dihalides, i.e. compounds of formula II in which $R_1$ or $R_2$ also represents hal. The ester halides or amide halides of formula I ($R_1$ or $R_2$ = hal) obtained are then reacted with alcohols or amines of formula $R_2H$ or $R_1H$, i.e. compounds in which $R_2$ and $R_1$ represent O-alkyl, NH-alkyl, or N-dialkyl.

The substituents $R_3$ to $R_8$ may have the following meanings: 6-fluoro, 6-chloro, 6-bromo, 7-chloro, 7-bromo, 5,8-dichloro-, 5,6,8-trichloro, 6-methyl, 2-methyl, 3-methyl, 6-methoxy, 6-methylmercapto, 6-tert. butoxy, 6-ethoxy, 6-chloro-2-methyl, 6-chloro-3-methyl, 6-chloro-5,8-dimethyl, the numbers indicating the position of the substituents at the thiochromane nucleus. Preferred are those compounds which are unsubstituted in the benzene moiety.

The thiochromanone oximes of formula III used as starting material for carrying out the process of the invention as well as the salts of these compounds are partly described in literature (for example J. Ind. Chem. Soc. 43, pages 521 et seq. (1966). Those not yet disclosed may be prepared in an analogous manner.

The starting compounds of formula II are known and readily accessible on an industrial scale by conventional methods.

The reaction is generally carried out with approximately stoichiometric amounts of the reactants; a slight excess (up to 10%) of compound II may be of advantage.

The reaction is preferably carried out in a solvent that is inert under the reaction conditions, for example ethers, such as diethyl ether, diisopropyl ether, glycol dimethyl ether, tetrahydrofurane, dioxane; ketones and nitriles, such as acetone, methylethyl ketone, methylisopropyl ketone, methylbutyl ketone, benzonitrile, propionitrile, acetonitrile; benzene and alkyl benzenes, such as toluene or xylene; halobenzenes, for example chlorobenzene, dichlorobenzene; as well as halogenated aliphatic compounds such as methylene chloride, chloroform, carbon tetrachloride and dichloroethane.

When free thiochromanone oximes of formula III are used as starting materials a basic agent must be added to bind the hydrogen halide set free.

Suitable acid-binding agents are especially alkali metal alcoholates such as sodium or potassium methylate or ethylate; sodium hydride, alkali metal carbonates such as sodium carbonate and potassium carbonate, as well as tertiary bases, for example triethyl amine or pyridine.

Instead of the free thiochromanone oximes there may also be used the salts thereof, preferably the alkali metal and alkaline earth metal salts. In this case a basic agent need not be added.

The process of the invention can be carried out within a wide temperature range. In general, it is performed at room temperature or slightly or moderately elevated temperature, preferably in the range of from 20° to 100°C. In most cases the reaction is exothermic and, therefore, it is often necessary, especially at the beginning of the reaction, to cool the reaction mixture from the outside. To complete the reaction it has proved advantageous to continue stirring for a prolonged period of time (one to three hours) while heating.

After distillation of the solvent the reaction products are obtained in the form of oils which crystallize in some cases.

The compounds of formula I are novel and represent a new class of phosphoric and phosphonic acid esters. While having a very low toxicity to warm-blooded animals they possess a good pesticidal especially insecticidal, acaricidal and nematocidal activity. In the field of plant protection they are particularly useful for combating noxious sucking and biting insects and mites.

Another advantage of the compounds is the fact that they are active against parasite stains which are resistant to other pesticides.

The phosphoric and phosphonic acid derivatives of the invention may be formulated in admixture with solid or liquid inert carrier substances, adhesives, wetting and dispersing agents, or grinding auxiliaries in the form of wettable powders, emulsions, suspensions, dusting powders, granules, fly-bands, and products for spreading and washing. They may be mixed with other insecticides, fungicides, nematocides and herbicides.

As carrier material for solid preparations mineral substances, for example aluminium silicates, argillaceous earths, kaolin, chalks, siliceous chalks, talcum, kieselguhr or hydrated silicic acids can be used, or preparations of these mineral substances with special additives, for example chalk which sodium stearate. As carrier material for liquid preparations all usual and suitable organic solvents may be employed, for example toluene, xylene, diacetone alcohol, isophorone, gasolines paraffin oils, dioxan, dimethyl formamide, dimethyl sulfoxide, ethyl acetate, butyl acetate, tetrahydrofurane and chlorobenzene.

Suitable adhesives are glue-like cellulose products or polyvinyl alcohols.

As wetting agents, all suitable emulsifiers may be used. For example ethoxylated alkylphenols, salts of aryl- or alkyl-aryl-sulfonic acids, salts of ethoxylated benzenesulfonic acids, or soaps.

Suitable dispersing agents are cellulose pitch (salts of lignin-sulfonic acids), salts of naphthalenesulfonic acid or, in certain cases, hydrated silicic acids or kieselguhr.

As grinding auxiliaries, suitable inorganc or organic salts, for example sodium sulfate, ammonium sulfate, sodium carbonate and sodium bicarbonate, sodium thiosulfate, sodium stearate, or sodium acetate may be used.

Simple compositions suitable for testing the activity of the compounds may be obtained in the following manner:

WETTABLE POWDER 6 g of active substance are ground with 6 g of finely dispersed silicic acid, and subsequently mixed in a mixer with 48 g of a mixture containing 13.3% of dried cellulose waste liquor, 65.3% of quartz and aluminium silicate; 15.3% of finely dispersed silicic acid, 4.7% of polypropylene-glycol and 1.3% of the sodium salt of oleylmethyltauride.. Thus, 60 g of a 10% wettable powder are obtained.

EMULSIFIABLE CONCENTRATE 2 g of active substance, 16 g of cyclohexanone and 2 g of alkylaryl-polyglycol ether alcohol are mixed with each other. 20 g of a 10% emulsifiable concentrate are obtained.

The following Examples illustrate the invention.

GENERAL INSTRUCTION 0.1 Mol of an oxime of formula III is dissolved in 150 ml of glycol dimethyl ether and the solution is added dropwise while stirring to a suspension of 0.1 mol of sodium hydride in 30 ml of glycol dimethyl ether. When the addition is completed the mixture is stirred for another 30 minutes. If necessary, the temperature is kept below +30°C by external cooling. Next a solution of 0.11 mol of an acid chloride of formula II is added dropwise at a rate such that the internal temperature of the mixture does not exceed +30°C. Stirring is continued for 3 hours at room temperature. The mixture is then diluted with 0.5 l of benzene, the organic phase is separated, thoroughly washed with water, and dried over sodium sulfate. After distillation of the solvent the reaction products are obtained in the form of oils which partly crystallize on being triturated.

The compounds listed in the following table were prepared by this method.

| Example | structural formula | $n_D$ or melting point (m.p.) | yield % | sum formula | mol. weight | Analysis calc. | | found |
|---|---|---|---|---|---|---|---|---|
| 1 | 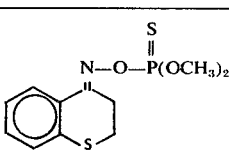 | $n_D^{25.5}$ 1.6113 | 71 | $C_{11}H_{14}NO_3PS_2$ | 303 | 43.6<br>4.6<br>4.6<br>10.2<br>21.1 | C<br>H<br>N<br>P<br>S | 43.3<br>4.5<br>4.6<br>10.4<br>21.4 |
| 2 | 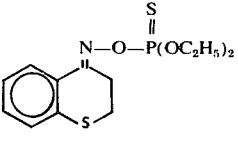 | $n_D^{34}$ 1.5479 | 82 | $C_{13}H_{18}NO_3PS_2$ | 331 | 47.1<br>5.4<br>4.2<br>9.4<br>19.3 | C<br>H<br>N<br>P<br>S | 45.6<br>5.8<br>4.3<br>9.7<br>19.3 |
| 3 | 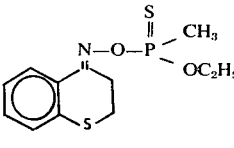 | m.p. 62°–63°C | 65 | $C_{12}H_{16}NO_2PS_2$ | 301 | 47.8<br>5.4<br>10.2<br>21.3 | C<br>H<br>P<br>S | 48.7<br>5.7<br>9.7<br>21.1 |

| Example | structural formula | $n_D$ or melting point (m.p.) | yield % | sum formula | mol. weight | Analysis calc. | | found |
|---|---|---|---|---|---|---|---|---|
| 4 | benzothiazine-N-O-P(=O)(CH₃)N(CH₃)₂ | $n_D^{23.2}$ 1.596 | 72 | $C_{12}H_{17}N_2O_2PS$ | 284 | 50.7 6.0 9.8 11.3 | C H N S | 50.6 6.0 9.3 11.1 |
| 5 | F-benzothiazine-N-O-P(=S)(OCH₃)₂ | $n_D^{28}$ 1.586 | 71 | $C_{11}H_{13}FNO_3PS_2$ | 321 | 41.1 4.1 4.4 9.7 19.9 | C H N P S | 40.2 4.4 4.3 9.9 20.1 |
| 6 | F-benzothiazine-N-O-P(=S)(OC₂H₅)₂ | $n_D^{26}$ 1.5604 | 90 | $C_{13}H_{17}FNO_3PS_2$ | 349 | 44.7 4.8 4.0 8.9 18.3 | C H N P S | 45.0 4.7 4.2 9.2 18.3 |
| 7 | F-benzothiazine-N-O-P(=S)(CH₃)(OC₂H₅) | m.p. 101–103°C | 90 | $C_{12}H_{15}FNO_2PS_2$ | 319 | 45.1 4.7 9.7 | C H P | 45.0 4.9 9.5 |
| 8 | F-benzothiazine-N-O-P(=S)(CH₃)N(CH₃)₂ | m.p. 69–71°C | 75 | $C_{12}H_{16}FN_2OPS_2$ | 318 | 45.3 5.0 8.8 9.7 20.1 | C H N P S | 44.5 5.0 8.7 9.5 19.3 |
| 9 | F-benzothiazine-N-O-P(=O)(OC₂H₅)₂ | $n_D^{22}$ 1.535 | 51 | $C_{13}H_{17}FNO_4PS$ | 333 | 46.8 5.2 4.2 9.3 9.6 | C H N P S | 46.2 5.5 3.8 10.0 9.5 |
| 10 | Cl-benzothiazine-N-O-P(=S)(OCH₃)₂ | $n_D^{24}$ 1.6088 | 95 | $C_{11}H_{13}ClNO_3PS_2$ | 337.5 | 39.1 3.9 9.2 18.9 | C H P S | 38.4 3.9 9.2 18.4 |
| 11 | Cl-benzothiazine-N-O-P(=S)(OC₂H₅)₂ | $n_D^{24}$ 1.574 | 87 | $C_{13}H_{17}ClNO_3PS_2$ | 365.5 | 42.7 4.6 3.8 8.5 17.5 | C H N P S | 43.0 4.8 3.7 8.0 17.4 |
| 12 | Cl-benzothiazine-N-O-P(=O)(OC₂H₅)₂ | $n_D^{25}$ 1.5709 | 52 | $C_{13}H_{17}ClNO_4PS$ | 349.5 | 44.8 4.9 4.0 9.2 | C H N S | 44.9 4.8 3.7 9.0 |
| 13 | Cl-benzothiazine-N-O-P(=S)(CH₃)(OCH₃) | m.p. 96°C | 93 | $C_{11}H_{13}ClNO_2PS_2$ | 321.5 | 41.1 4.0 4.4 19.9 | C H N S | 41.5 4.2 4.3 19.4 |

| Example | structural formula | $n_D$ or melting point (m.p.) | yield % | sum formula | mol. weight | calc. | | Analysis found |
|---|---|---|---|---|---|---|---|---|
| 14 | Cl-[benzothiine]-N—O—P(=S)(CH₃)(OC₂H₅) | m.p. 73–76°C | 61 | C₁₂H₁₅ClNO₂PS₂ | 335.5 | 42.9<br>4.5<br>9.2<br>19.1 | C<br>H<br>P<br>S | 43.1<br>4.4<br>8.7<br>19.0 |
| 15 | Cl-[benzothiine]-N—O—P(=S)(C₆H₅)(OC₂H₅) | $n_D^{25}$ 1.6401 | 98 | C₁₇H₁₇ClNO₂PS₂ | 397.5 | 51.3<br>4.3<br>3.5<br>7.8<br>16.2 | C<br>H<br>N<br>P<br>S | 51.6<br>4.4<br>3.8<br>7.4<br>16.5 |
| 16 | Cl-[benzothiine]-N—O—P(=S)(CH₃)(N(CH₃)₂) | Oil | 90 | C₁₂H₁₆ClN₂OPS₂ | 334.5 | 43.1<br>4.8<br>8.4<br>19.1 | C<br>H<br>N<br>S | 43.8<br>5.1<br>8.8<br>19.0 |
| 17 | Br-[benzothiine]-N—O—P(=S)(OCH₃)₂ | $n_D^{22}$ 1.6368 | 90 | C₁₁H₁₃BrNO₃PS₂ | 382 | 34.6<br>3.4<br>3.7<br>16.7 | C<br>H<br>N<br>S | 35.2<br>3.4<br>3.8<br>16.5 |
| 18 | Br-[benzothiine]-N—O—P(=S)(OC₂H₅)₂ | $n_D^{22}$ 1.6142 | 88 | C₁₃H₁₇BrNO₃PS₂ | 410 | 38.0<br>4.2<br>3.4<br>15.6 | C<br>H<br>N<br>S | 38.4<br>4.2<br>3.5<br>15.9 |
| 19 | Br-[benzothiine]-N—O—P(=S)(CH₃)(OC₂H₅) | $n_D^{22}$ 1.6309 | 87 | C₁₂H₁₆BrNO₂PS₂ | 380 | 37.9<br>3.9<br>3.7<br>16.8 | C<br>H<br>N<br>S | 38.4<br>4.1<br>3.6<br>16.5 |
| 20 | Br-[benzothiine]-N—O—P(=S)(CH₃)(N(CH₃)₂) | Oil | 55 | C₁₂H₁₆BrN₂OPS₂ | 379 | 38.0<br>4.2<br>7.3<br>16.8 | C<br>H<br>N<br>S | 38.5<br>4.2<br>6.8<br>16.4 |
| 21 | Br-[benzothiine]-N—O—P(=O)(CH₃)(N(CH₃)₂) | m.p. 79–80°C | 93 | C₁₂H₁₆BrN₂O₂PS | 363 | 39.6<br>4.4<br>7.7<br>8.5<br>8.8 | C<br>H<br>N<br>P<br>S | 39.4<br>4.4<br>7.7<br>8.6<br>9.0 |
| 22 | [benzothiine, Cl]-N—O—P(=S)(OCH₃)₂ | m.p. 106.107°C | 50 | C₁₁H₁₃ClNO₃PS₂ | 337.5 | 39.1<br>3.9<br>4.1<br>9.2<br>18.9 | C<br>H<br>N<br>P<br>S | 39.0<br>3.7<br>3.8<br>8.9<br>19.5 |
| 23 | [benzothiine, Cl]-N—O—P(=S)(OC₂H₅)₂ | $n_D^{25}$ 1.5991 | 98 | C₁₃H₁₇ClNO₃PS₂ | 365.5 | 42.7<br>4.6<br>3.8<br>8.5<br>17.5 | C<br>H<br>N<br>P<br>S | 43.0<br>4.5<br>4.1<br>8.8<br>17.6 |

| Example | structural formula | $n_D$ or melting point (m.p.) | yield % | sum formula | mol. weight | Analysis calc. | found |
|---|---|---|---|---|---|---|---|
| 24 | (8-Cl-thiochroman-4-ylidene)-N-O-P(=S)(CH₃)(OC₂H₅) | m.p. 65–67°C | 74 | $C_{12}H_{15}ClNO_2PS_2$ | 335.5 | 42.9 C, 4.5 H, 4.1 N | 43.1, 4.3, 4.1 |
| 25 | (6-CH₃-thiochroman-4-ylidene)-N-O-P(=S)(OCH₃)₂ | m.p. 53–55°C | 83 | $C_{12}H_{16}NO_3PS_2$ | 317 | 45.4 C, 5.1 H, 4.4 N, 20.2 S | 46.0, 5.2, 4.3, 19.6 |
| 26 | (6-CH₃-thiochroman-4-ylidene)-N-O-P(=S)(OC₂H₅)₂ | $n_D^{25.5}$ 1.5925 | 63 | $C_{14}H_{20}NO_3PS_2$ | 345 | 48.7 C, 5.8 H, 4.1 N, 18.6 S | —, 5.7, 4.1, 18.2 |
| 27 | (6-CH₃-thiochroman-4-ylidene)-N-O-P(=S)(CH₃)(OC₂H₅) | m.p. 60–62°C | 91 | $C_{13}H_{18}NO_2PS_2$ | 315 | 49.5 C, 5.7 H, 4.4 N, 9.8 P, 20.3 S | 49.8, 5.7, 4.5, 9.4, 20.3 |
| 28 | (6-CH₃-thiochroman-4-ylidene)-N-O-P(=S)(CH₃)(N(CH₃)₂) | $n_D^{23.2}$ 1.625 | 58 | $C_{13}H_{19}N_2OPS_2$ | 314 | 49.7 C, 6.1 H, 8.9 N, 9.8 P, 20.4 S | 51.1, 6.4, 8.1, 8.9, 20.8 |
| 29 | (6-CH₃O-thiochroman-4-ylidene)-N-O-P(=O)(CH₃)(N(CH₃)₂) | Oil | 90 | $C_{13}H_{19}N_2O_2PS$ | 298 | 52.3 C, 6.4 H, 10.7 S | 51.8, 6.4, 11.2 |
| 30 | (6-CH₃O-thiochroman-4-ylidene)-N-O-P(=S)(OCH₃)₂ | $n_D^{22}$ 1.605 | 60 | $C_{12}H_{16}NO_4PS_2$ | 333 | 43.2 C, 4.8 H, 4.2 N, 19.2 S | 43.2, 4.9, 4.2, 19.1 |
| 31 | (6-CH₃O-thiochroman-4-ylidene)-N-O-P(=S)(OC₂H₅)₂ | $n_D^{24}$ 1.5789 | 78 | $C_{14}H_{20}NO_4PS_2$ | 361 | 46.5 C, 5.5 H, 8.6 P, 17.7 S | 46.4, 5.8, 8.3, 17.7 |
| 32 | (6-CH₃O-thiochroman-4-ylidene)-N-O-P(=S)(CH₃)(N(CH₃)₂) | $n_D^{22}$ 1.591 | 52 | $C_{13}H_{19}N_2O_3PS$ | 314 | 49.7 C, 6.0 H, 8.9 N, 10.2 S | 50.1, 5.8, 8.5, 9.6 |
| 33 | (6-tert-butyl-thiochroman-4-ylidene)-N-O-P(=S)(OCH₃)₂ | $n_D^{24.5}$ 1.5782 | 80 | $C_{15}H_{22}NO_3PS_2$ | 359 | 50.2 C, 6.1 H, 3.9 N, 8.6 P, 17.8 S | 50.7, 6.2, 3.8, 8.2, 18.1 |

-Continued

| Example | structural formula | $n_D$ or melting point (m.p.) | yield % | sum formula | mol. weight | Analysis calc. | | found | |
|---|---|---|---|---|---|---|---|---|---|
| 34 | (CH₃)₃C-[benzothiazine]-N-O-P(S)(OC₂H₅)₂ | $n_D^{23}$ 1.5695 | 90 | C₁₇H₂₆NO₃PS₂ | 387 | 52.8 | C | 52.8 | |
| | | | | | | 6.7 | H | 6.6 | |
| | | | | | | 3.6 | N | 3.3 | |
| | | | | | | 8.0 | P | 7.6 | |
| 35 | (CH₃)₃C-[benzothiazine]-N-O-P(S)(CH₃)(OC₂H₅) | $n_D^{23.5}$ 1.5819 | 70 | C₁₈H₂₄NO₂PS₂ | 357 | 53.8 | C | 54.4 | |
| | | | | | | 6.7 | H | 6.7 | |
| | | | | | | 3.9 | N | 3.9 | |
| | | | | | | 17.9 | S | 17.9 | |
| 36 | (CH₃)₃C-[benzothiazine]-N-O-P(S)(CH₃)N(CH₃)₂ | m.p. 99–104°C | 60 | C₁₆H₂₅N₂OPS₂ | 356 | 7.0 | H | 6.9 | |
| | | | | | | 7.9 | N | 7.7 | |
| | | | | | | 17.9 | P | 17.2 | |
| 37 | [2-methyl-benzothiazine]-N-O-P(S)(OCH₃)₂ | $n_D^{22}$ 1.5979 | 73 | C₁₂H₁₆NO₃PS₂ | 317 | 45.4 | C | 45.6 | |
| | | | | | | 5.1 | H | 5.2 | |
| | | | | | | 4.4 | N | 4.4 | |
| | | | | | | 9.8 | P | 9.5 | |
| | | | | | | 20.2 | S | 19.8 | |
| 38 | [2-methyl-benzothiazine]-N-O-P(S)(OC₂H₅)₂ | $n_D^{24}$ 1.571 | 80 | C₁₄H₂₀NO₃PS₂ | 345 | 48.7 | C | 48.2 | |
| | | | | | | 5.8 | H | 6.1 | |
| | | | | | | 8.9 | P | 8.7 | |
| | | | | | | 18.6 | S | 18.0 | |
| 39 | [2-methyl-benzothiazine]-N-O-P(S)(CH₃)(OC₂H₅) | m.p. 98–100°C | 58 | C₁₃H₁₈NO₂PS₂ | 315 | 49.5 | C | 49.3 | |
| | | | | | | 5.7 | H | 6.1 | |
| | | | | | | 9.8 | P | 9.5 | |
| | | | | | | 20.3 | S | 20.5 | |
| 40 | [2-methyl-benzothiazine]-N-O-P(S)(CH₃)N(CH₃)₂ | m.p. 55–56°C | 57 | C₁₃H₁₉N₂OPS₂ | 314 | 6.1 | H | 6.1 | |
| | | | | | | 8.9 | N | 9.1 | |
| | | | | | | 9.8 | P | 9.1 | |
| | | | | | | 20.4 | S | 20.0 | |
| 41 | [2-methyl-benzothiazine]-N-O-P(O)(CH₃)N(CH₃)₂ | m.p. 149–150°C | 40 | C₁₃H₁₉N₂O₂PS | 298 | 9.4 | N | 9.0 | |
| | | | | | | 10.3 | P | 9.7 | |
| 42 | [3-methyl-thiochroman]-N-O-P(S)(OCH₃)₂ | $n_D^{25.5}$ 1.5971 | 86 | C₁₂H₁₆NO₃PS₂ | 317 | 45.4 | C | 45.0 | |
| | | | | | | 5.1 | H | 5.1 | |
| | | | | | | 4.4 | N | 4.4 | |
| | | | | | | 9.8 | P | 9.8 | |
| | | | | | | 20.2 | S | 20.5 | |
| 43 | [3-methyl-thiochroman]-N-O-P(S)(OC₂H₅)₂ | Oil | 89 | C₁₄H₂ONO₃PS₂ | 345 | 48.7 | C | 47.8 | |
| | | | | | | 5.8 | H | 5.7 | |
| | | | | | | 4.1 | N | 3.9 | |
| | | | | | | 8.9 | P | 8.9 | |
| | | | | | | 18.6 | S | 18.6 | |

| Example | structural formula | $n_D$ or melting point (m.p.) | yield % | sum formula | mol. weight | Analysis calc. | found |
|---|---|---|---|---|---|---|---|
| 44 | thiochroman with N—O—P(=S)(CH₃)(OC₂H₅), 3-CH₃ | $n_D^{23.2}$ 1.5959 | 94 | $C_{13}H_{18}NO_2PS_2$ | 315 | 49.5 C 5.7 H 4.4 N 9.8 P 20.3 S | 48.9 5.9 4.2 9.7 20.3 |
| 45 | thiochroman with N—O—P(=S)(CH₃)(N(CH₃)₂), 3-CH₃ | $n_D^{25.5}$ 1.6158 | 78 | $C_{13}H_{19}N_2OPS_2$ | 314 | 49.7 C 6.0 H 8.9 N 9.9 P 20.4 S | 49.0 6.1 8.7 9.6 20.1 |
| 46 | thiochroman with N—O—P(=O)(CH₃)(N(CH₃)₂), 3-CH₃ | m.p. 88–89°C | 35 | $C_{13}H_{19}N_2O_2PS$ | 298 | 52.4 C 6.4 H 10.7 S | 52.3 6.2 11.1 |
| 47 | 6-CH₃S-thiochroman with N—O—P(=S)(OC₂H₅)₂ | m.p. 71–72°C | 49 | $C_{14}H_{20}NO_3PS_3$ | 377 | 8.3 P 25.4 S | 8.9 25.1 |
| 48 | 8-Cl-thiochroman with N—O—P(=S)(CH₃)(N(CH₃)₂) | m.p. 100–112°C | 50 | $C_{12}H_{16}ClN_2OPS_2$ | 334.5 | 4.8 H 8.4 N 9.3 P | 4.8 8.4 9.4 |
| 49 | 8-Cl-thiochroman with N—O—P(=O)(CH₃)(N(CH₃)₂) | m.p. 89–100°C | 47 | $C_{12}H_{16}ClN_2O_2PS$ | 318.5 | 45.2 C 5.0 H 8.4 N | 45.6 5.1 8.4 |

EXAMPLE 50

Horse beans (*Vicia faba*) strongly infested with bean aphids (*Doralis fabae*) were sprayed to the drip-off with the aqueous dilution of an emulsion concentrate containing as active ingredient 0.003% by weight of the compound of Example 1. The sprayed plants were placed in the greenhouse at 20°C and the result was evaluated 24 hours after spraying. It was found that all aphids had been killed.

Compounds of Examples 2, 5, 6, 23, and 42 tested in the same manner showed an equally good effect.

EXAMPLE 51

Apple trees in pots strongly infested with a strain of PE resistant fruit tree red spiders (*Metatetranychus ulmi*) were sprayed to the drip-off with the aqueous dilution of an emulsion concentrate containing as active ingredient 0.025% by weight of the compound of Example 3 and the plants were placed in the greenhouse at 20°C. Examination under a microscope 8 days after the treatment showed that all movable stages of the mites had been killed.

Compounds of Examples 6, 7, 14 and 18 tested in the same manner showed an equally good effect.

Commercial phosphoric acid esters used for comparison did not exhibit any effect when applied in the same or even in higher concentration:

| | | |
|---|---|---|
| phenkapton | 0.025 % by weight | without effect |
| methyl demeton | 0.05 % by weight | without effect |
| dimethoate | 0.05 % by weight | without effect |

EXAMPLE 52

Mealworm larvae (*Tenebrio molitor*) were sprayed on a support (filter paper) with a dosed quantity of an aqueous suspension of a wettable powder containing the compound of Example 5 as active ingredient and kept in Petri dishes at 22°C in the laboratory. 0.006 mg/cm² of active ingredient was sufficient to kill all larvae within 48 hours.

The compound of Example 6 used in the same concentration had an equally good effect.

EXAMPLE 53

The bottoms and insides of five Petri dishes having a diameter of 9 cm were uniformly sprayed with 1 cc each of a 0.003% acetonic solution of the compound of Example 3. After evaporation of the acetone 10 German cockroaches (*Phyllodromia germanica*) were placed in each dish. Within 2 hours all animals were in the permanent dorsal position (moribund state) and died.

The compound of Example 6 used in the same concentration had an equally good effect.

EXAMPLE 54

The bottoms and insides of five Petri dishes having a diameter of 9 cm were uniformly sprayed with 1 cc each of a 0.003% acetonic solution of the compound of Example 25. After evaporation of the acetone 10 house flies (*musca domestica*) were placed in each dish. Within 30 minutes all flies were in permanent dorsal position (moribund state) and died.

Under identical conditions the compound of Example 43 had an equally good effect.

We claim:

1. Compound of the formula

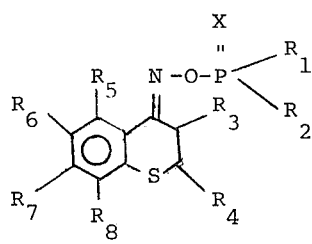

in which $R_1$ is O-alkyl, NH-alkyl, or N-dialkyl, $R_2$ is alkyl, O-alkyl, or phenyl, wherein the $R_1$ and $R_2$ alkyl constituent has 1 to 10 carbon atoms, $R_3$ and $R_4$ are each hydrogen or lower alkyl, $R_5$, $R_6$, $R_7$, $R_8$ are each hydrogen, halogen, lower alkyl, lower alkoxy or lower alkylthio, and X is oxygen or sulfur.

2. The compound of the formula

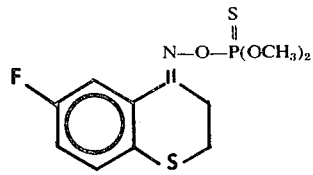

3. The compound of the formula

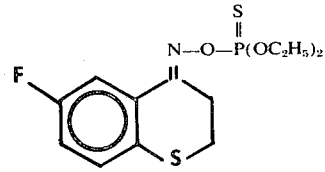

4. The compound of the formula

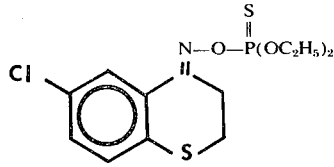

5. The compound of the formula

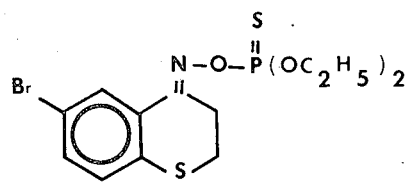

6. Compound of the formula

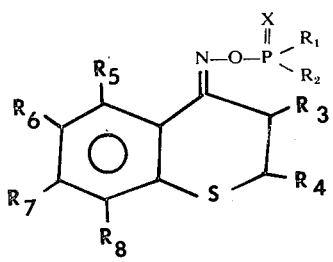

in which $R_1$ is O-alkyl, NH-alkyl, or N-dialkyl, $R_2$ is alkyl, O-alkyl, or phenyl, $R_3$ and $R_4$ are each hydrogen or lower alkyl, $R_5$, $R_6$, $R_7$, $R_8$ are each hydrogen, halogen, lower alkyl, lower alkoxy or lower alkylthio, the alkyl constituent of each of $R_1$ to $R_8$ having 1 to 4 carbon atoms, and X is oxygen or sulfur.

7. The compound of claim 6 wherein said halogen is fluorine, chlorine or bromine, the alkyl constituent of each of $R_3$ to $R_8$ is methyl or ethyl and at least one of $R_3$ and $R_4$ and at least three of $R_5$ to $R_8$ are hydrogen.

8. The compound of claim 6 wherein the substituents $R_3$ to $R_8$ are selected from the group consisting of 6-fluoro, 6-chloro, 6-bromo, 7-chloro, 7-bromo, 5,8-dichloro-, 5,6,8-trichloro, 6-methyl, 2-methyl, 3-methyl, 6-methoxy, 6-methylmercapto, 6-tert. butoxy, 6-ethoxy, 6-chloro-2-methyl, 6-chloro-3-methyl, 6-chloro-5,8-dimethyl, said numbers indicating the position of the substituents at the thiochromane nucleus.

9. The compound of claim 6 wherein X is oxygen.

10. The compound of claim 6 wherein X is sulfur.

11. The compound of claim 6 wherein $R_1$ is methyl, $R_2$ is ethoxy, $R_3$ to $R_8$ are each hydrogen and X is sulfur.

12. The compound of claim 6 wherein $R_1$ and $R_2$ are each methoxy, $R_6$ is fluorine, $R_3$, $R_4$, $R_5$, $R_7$ and $R_8$ are each hydrogen and X is sulfur.

13. The compound of claim 6 wherein $R_1$ and $R_2$ are each ethoxy, $R_6$ is fluorine, $R_3$, $R_4$, $R_5$, $R_7$ and $R_8$ are each hydrogen and X is sulfur.

14. The compound of claim 6 wherein $R_1$ is methyl, $R_2$ is ethoxy, $R_6$ is fluorine, $R_3$, $R_4$, $R_5$, $R_7$ and $R_8$ are each hydrogen and X is sulfur.

15. The compound of claim 6 wherein $R_1$ and $R_2$ are each ethoxy, $R_6$ is chlorine and $R_3$, $R_4$, $R_5$, $R_7$ and $R_8$ are each hydrogen and X is sulfur.

16. The compound of claim 6 wherein $R_1$ and $R_2$ are each ethoxy, $R_6$ is bromine, $R_3$, $R_4$, $R_5$, $R_7$ and $R_8$ are each hydrogen and X is sulfur.

* * * * *